May 25, 1943.  R. F. YOUNG  2,319,897
VEHICLE DOOR OPERATING MEANS
Filed April 21, 1941   2 Sheets-Sheet 1

INVENTOR:
Robert F. Young,
BY:
Horace S. Woodward,
ATTORNEY.

May 25, 1943. R. F. YOUNG 2,319,897
VEHICLE DOOR OPERATING MEANS
Filed April 21, 1941 2 Sheets-Sheet 2
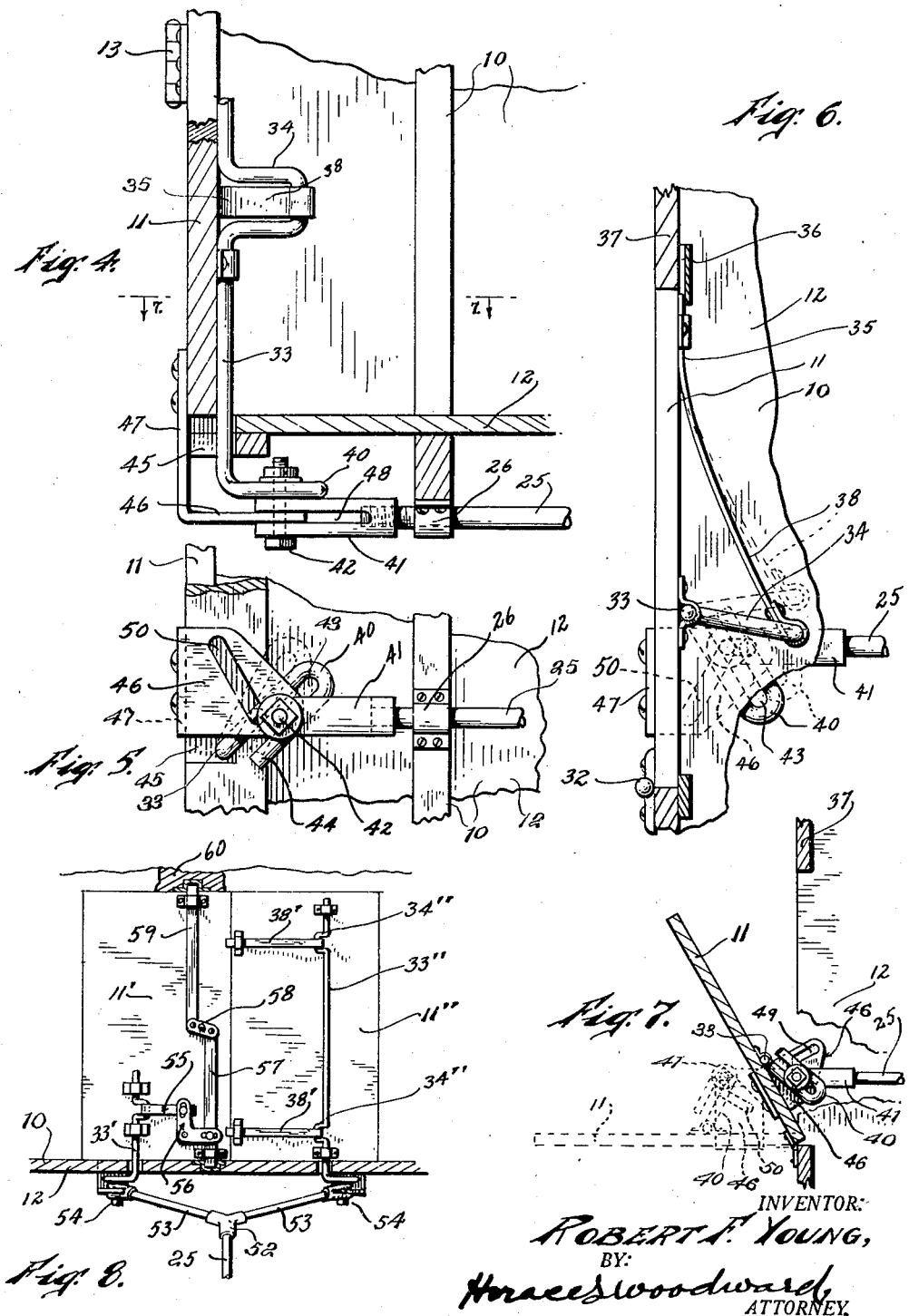
INVENTOR:
ROBERT F. YOUNG,
BY:
Horace S Woodward
ATTORNEY.

Patented May 25, 1943

2,319,897

UNITED STATES PATENT OFFICE 2,319,897

VEHICLE DOOR OPERATING MEANS

Robert F. Young, Smithdale, Miss., assignor of one-half to Henry E. Barnett, Summit, Miss.

Application April 21, 1941, Serial No. 389,651

3 Claims. (Cl. 268—3)

The invention has for an object to effect improvements in operating means for doors in vehicles, and particularly to rear doors of passenger buses, and other vehicles, including particularly commercial delivery trucks having a rear entrance.

It is an important aim of the invention also to present a door operating means which enables the door to be utilized only as an emergency exit, if desired, especially on passenger buses, and which will have peculiar advantages for such uses.

An important aim of the invention is to provide a simple operating means to be operated either by the hand or the foot of the vehicle driver at the front end, and which will be automatically locked in closed position and securely held in open position when so operated.

A further important aim of the invention is to present an extremely simple operating means for such purposes which may be incorporated in conventional constructions of bus bodies and truck bodies without requiring modifications of design of the bus or truck bodies. It is an advantage of the invention that the operating means may be located under the floor of the vehicle, in the side wall thereof, or overhead, as will be understood, the adaptation of the device to these various locations being obvious from the following disclosure, wherein its use at the floor of a vehicle is disclosed in detail.

It is also an important aim of the invention to present a novel means for securing the door in closed position, operative by the same means that moves the door to or from closed position.

It is also an important aim of the invention to present such a device which will be liable in a minimum degree to damage or derangement.

Additional objects, advantages and features of invention reside in the construction, arrangement and combination of parts involved in the embodiment of the invention, as will be more readily understood from the following description and accompanying drawings, wherein Figure 1 is a longitudinal vertical sectional view of a vehicle body, the running gear and body mounting being omitted, and portions being broken away otherwise, to minimize the space required for the drawings.

Figure 4 is an elevational enlargement of the connections with the rear door,

Figure 5 is a bottom view of these connections.

Figure 6 is a horizontal section through the door showing the latch means.

Figure 7 is a top view of the operative connections with the door as shown in Figure 5, on a small scale, showing the door partly open, and in full open position dotted;

Figure 8 is an elevational view of a double door from the inner side, showing the door in closed position and the operating means formally indicated;

Figure 1:
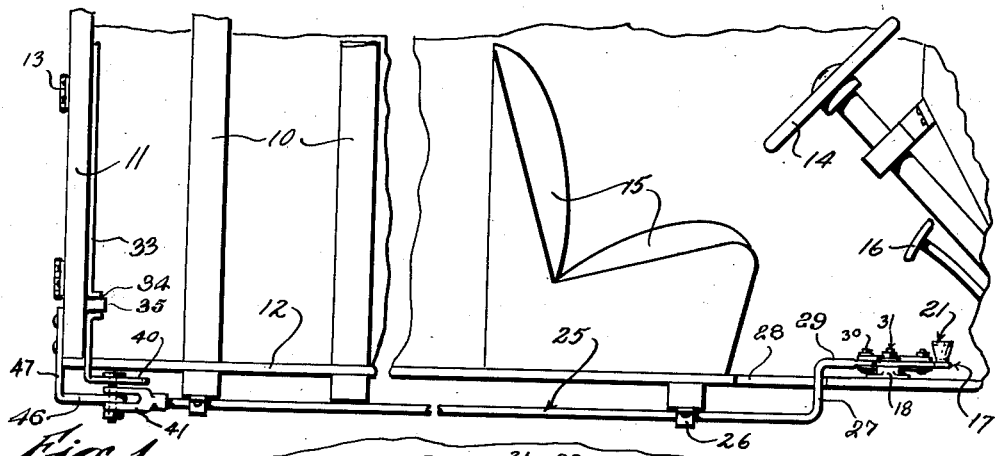

Referring more particularly to the drawings, there is illustrated in Figure 1, a vehicle body having a rear single door 11, hinged on a vertical axis to open outwardly, and in the present instance, it is assumed that this door is hinged at the right-hand side of the vehicle, facing forwardly. The remainder of the views may relate to either a single or double doors, in accordance with the description to follow. The vehicle body includes a floor 12, which may be of conventional construction, and the framing of the body otherwise may also be conventional, the hinges 13 of the door being of any usual type suitable for a door of the kind. A conventional showing of a vehicle steering column and wheel 14 in a normal relation to a driver's seat 15 is shown, and any usual controls to be manipulated by the driver may be incorporated on such truck, in the usual locations, a clutch or brake pedal 16 being indicated in normal location. The vehicle may include other conventional features of construction, as entrance doors other than the one 11, located in accordance with conventional practices, which may be used for normal entrance and exit of passengers, or operator, such details not being illustrated, as they are well understood in the art and there are various constructions of such elements available commercially, for incorporation in vehicles of the various kinds upon which my invention may be used.

The construction indicated in Figure 1, is such as might be utilized in a school bus, wherein the door 11 would be used as an emergency exit, although such door might also be used as an emergency exit in public passenger carrying vehicles or buses, of various kinds. The door opening may be located as found most desirable and convenient, or effective for the uses contemplated, and in the present instance may be a conventional door, glazed or not, as desired, mounted by the hinges 13 so as to swing freely from closed position to open position, and back to closed position, when desired, no locking device or latch other than the parts described hereinafter being incorporated thereon, preferably, although in some instances a special separate lock may be utilized for securing the door in closed position, when the device is used in a straight or commodity hauling truck, or otherwise where it may be found desirable to so lock the door. However, it is an advantage of my invention that the door is securely held in closed position by the operating means to be described, so that such operating means in effect operates as a lock for the door until purposely operated to open the door.

The invention involves generally a connection with the door at a distance from the hinge, including an operating rod reciprocating longitudinally of the vehicle body to push the door open and draw it to a closed position, this rod being operated by manual or pedal means at the operator's seat 15.

Figure 2:
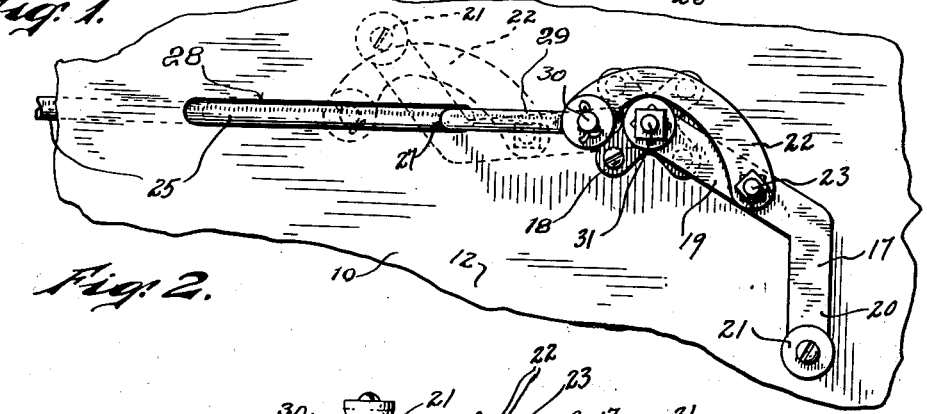
Figure 2 is a top view of the operator's lever and connection therefrom, enlarged.
Figure 3:
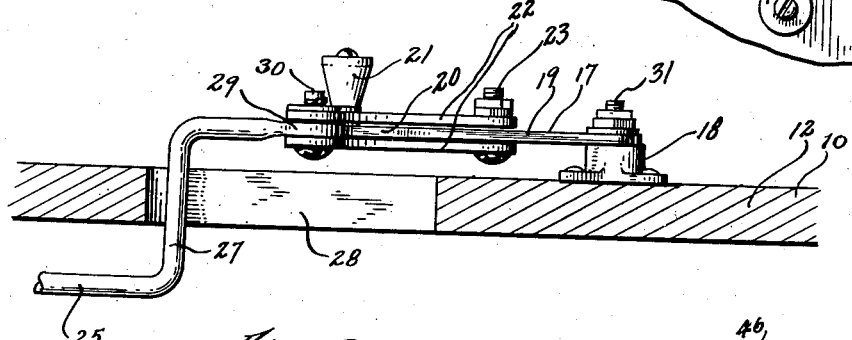
Figure 3 is an elevational view of the structure of Figure 2 in door opening position.

In the present instance, there is mounted on the floor 12 convenient to the hand or foot of the operator, and preferably, to one side of the normal position of the operator's feet, a main operating lever 17 of the second order, pivoted upon a crowsfoot bracket or the like 18, adapted to be bolted or screwed to the floor 12. The lever 17 includes an inner rectilinear portion 19, and an outer oblique portion 20 extended from the inner portion in a clockwise direction, and on the extremity of the lever there is mounted an operating knob or the like 21, suitable for manual or foot operation, as may be desired. Two curved links 22 of identical form are pivoted at one extremity of each, centrally of the lever, one at the upper side of the arm 19, and the other at the lower side thereof, with concave sides presented toward the right, these links being of such length and curvature, that when the lever 17 is at its closed and forward position, as indicated in dotted lines in Figure 2, the outer ends of the links will be swung to a position with both ends on a line to the right of the pivot axis of the lever. The pivot 23 of these links on the lever is so located, and the length of the levers is such that when the main operating lever 17 is in closed position as stated, the outer ends or rear of the links 22 will lie closely adjacent the pivot axis of the lever 17, for which reason the links 22 are curved principally adjacent their outer ends, that is, on a shorter radius, in order to permit the extremities to swing beyond dead center relation to the pivot axis of the lever 17 as stated. A main door operating link or rod 25 is mounted slidably beneath the floor 12, in any usual mounting suitable for the purpose, simple strap guides 26 being indicated in the present instance, attached to the cross bars or other members of the body structure. This rod is formed with a right angle upward extension 27, extended through a slot 28 in the floor 12, the slot extending longitudinally of the vehicle, and being utilized in the present instance as a guide means for the forward end of the rod 25. Immediately above the floor, the rod is formed with a horizontal forward extension and eye 29, which is pivoted between the outer ends of the links 22 by means of a conventional bolt or pin 30. The eye 29 of the rod is preferably of a thickness equal to, or slightly greater than, that of the central body portion of the lever 17 from the bolt 23 to the outer end of the lever, which in the last named part is of uniform thickness, so that when the lever is swung to the left and then rearwardly, the angle of the lever and nearly the entire forward part thereof may swing between the links 22 without obstruction, as dotted in Figure 2. The bracket 18 is located with the pivot stud 31 thereon, (upon which the lever 17 is fulcrummed), in line with the slot 28, and it will be observed that when the lever is at its forward position, as shown in full lines, a rearward pull of the rod 25 will act through a line to the right of the stud 31, and so tend to pull the lever 17 further toward the right, this movement, however, being checked by engagement of the inner sides of the links 22 against the bracket 18 and pivoted end of the lever 17. Likewise, when the lever is moved counter-clockwise, toward the left, to the full dotted position shown in Figure 2, which will be the rear limit of movement of the lever and door opening position, the pivot 23 will have moved beyond dead center relation to the right of a line from the rod 25 to the stud 31, so that tendency of the rod 25 to push forward will be opposed because the force therein will tend to move the lever further to the right, which movement will be checked by engagement of the knob 21 against the outer sides of the links 22.

Preferably, one of the hinges of the door, indicated at 32 in Figure 6, is a spring-loaded hinge of any conventional form suitable for the use, details of which are not shown, for the reason that suitable hinges are commercially available for the use. The loading is such that the hinge tends to open the door, for reasons which will be explained in greater detail. Other spring means may be utilized tending to move the door to open position, as discretion may dictate, so that common hinges may be used throughout on the door. The door has a vertical rock shaft 33 mounted revolubly thereon, with one or more cranks 34 therein, one being illustrated. A sliding latch member 35 is mounted on the door, at its swinging edge, one or more of these being used, as desired, the latch end being adapted to engage as a bolt in a keeper 36 mounted on the door jamb 37 comprising part of the rear wall and framing of the vehicle body. The latch bar 35 may be of slightly flexible strap metal, preferably resilient material, which is extended inwardly and engaged revolubly with the wrist portion of the crank 34, so that rotation of the shaft 33 will operate the bar 35, either to shoot the bolt portion or withdraw the same from the keeper 36. The inwardly extended portion 38 of the latch bar or bolt has its end bent to form an eye engaged around the wrist portion of the crank 34, as shown in Figure 6, and normally the crank 34 extends outwardly from the door so that movement of the crank in one direction will push the latch 35 outward, and movement of the crank in the opposite direction will withdraw the latch, as may be understood. The radius of the crank 34 may be comparatively short, as but little movement of the latch 35 is required in the operation of the device. The shaft 33 is extended downwardly through the floor 12 in the present instance, spaced somewhat from the axis of the rod 25 toward the swinging edge of the door and formed with an arm portion 40, extending approximately radially from the axis of the shaft 33 in a definite relation to the crank 34 and the direction of movement of the operating rod 25, as will be explained and will become apparent from the following disclosure. The angle of the arm 40 with respect to the radius of the crank 34 is such, and the location of the shaft 33 is such that the arm 40 extends diagonally across and above the line of movement of the shaft 25 when the crank 34 is extended forwardly, and when the latch bolt is engaged in the keeper. Fixed on the rear end of the rod 25, there is a clevis, 41, in the extremities of which a vertical pin or bolt 42 is engaged, this pin being extended above the clevis a distance and engaged slidably in a slot 43, formed longitudinally in a radial arm 40 on the lower end of the shaft 33. The angular position of the arm 40 with respect to the direction of movement of the clevis and rod 25 at this time is an acute one, and on initial rearward movement of the rod 25 the pin 42 will press against one side of the slot 43 and so move the arm 40 laterally and rearwardly, rotating the shaft 33 in a direction to swing the crank 34 away from the keeper 36, so that the latch 33 is withdrawn. Forward movement of the rod 25 and clevis at this time will correspondingly cause a reverse operation of the parts, so that the latch 35 will be shot into engagement with the keeper 36, and the door 11 will be held in closed position.

It will be appreciated that when the latch 35 is withdrawn, the spring hinge 32 will tend to cause the door to swing open, but positive movement of the door will be in addition effected by the connections now to be described. In the present instance, the arm 40 and its slot 43 are formed by bending the lower end of the shaft 33 horizontally at right angles, the end portion of the shaft being extended rectilinearly a distance, and then recurved in spaced parallel relation to its adjacent inner horizontal part, and at the same level, as at 44, the space between the returned part and the inner part of the material of the shaft thus constituting the slot 43.

Figure 9:
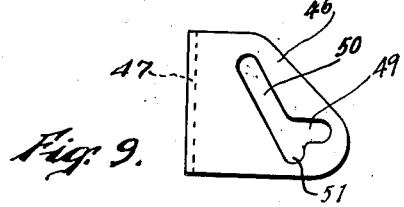
Figure 9 is a detail plan of the cam plate 46.

It will be noted that in order to accommodate the shaft 33 as the door opens, the lower end portion of the shaft immediately below the door is accommodated in a slot 45 in the floor 12 open on the rear face of the vehicle body, so that the shaft 33 may swing out of and into the slot as the door opens and closes. To enable the proper operation of the arm 40 by the rod 25, the shaft 33 is spaced to one side of the axis of the rod 25 and the arm 40 extended across the axis at a distance thereabove. Fixed on the lower outer face of the door by an upper attaching flange 47 there is a door-operating cam plate 46 (illustrated in Fig. 9), this flange part extending below the door and there having a part turned at right angles and extended horizontally inward and forwardly, spaced below the floor 12, and constituting the operating plate 46. The plate 46 is at such level as to engage slidably between the arms of the clevis 41, which are elongated sufficiently to form a slot 48 therebetween extending some distance forwardly, so as to permit a certain amount of relative movement of the clevis with respect to the plate 46.

The plate 46 is formed with a diagonal slot 50, having a forward arm portion 49 which, when the door is closed, extends longitudinally of the device, in line with the path of movement of the clevis pin 42 from its extreme forward position, the slot 50 being an oblique rectilinear rear part extended from the rear end of the forward part 49 rearward and laterally toward the swinging edge of the door. In this the pin 42 may slide after it passes from the first mentioned part 49 of the slot. The length of the forward part 49 of the slot is such that it permits movement of the pin 42 therein, sufficient to operate the arm 40 to the extent necessary to withdraw or shoot the bolt portion 35 without moving the door, as will be understood. In further rearward movement of the rod 25, after completion of the operation of the arm 40 and withdrawal of the bolt 35, the pin 42 will engage the rear side of the diagonal portion 50 of the slot, pressing rearwardly thereagainst with sufficient force to open the door. In the first part of this movement of the door, the pin 42 will slide outwardly in the arm 50 of the slot a short distance, and as the door swings further open, it will move backwardly therein, and if necessary, the slot may have a short continuation 51 in line with the portion 50 at the opposite side of the forward portion 49 of the slot, to permit the necessary movement of the door to extreme open position.

As shown in Figures 5, 6, and 7, it will be noted that in the initial movement of the arm 40 it moves from a position nearly at right angles to the arm 50 of the slot in a direction tending to coincide with the direction of the slot 50, and change of position of the pin 42 relatively to the plane of the door thereafter is comparatively slight, so that but little movement of the arm 40 occurs during the opening movement of the door.

The device as described may be utilized for operating double doors by simply duplicating the elements on the doors and forming the connection between the shaft 33 and rod 25 for each door, and branching the connection between the rod 25 and the two operating units in a suitable manner, as illustrated in Figure 8, where a rigid yoke or connection piece 52 is fixed on the rear end of the rod 25, from which rigid arms 53 extend to right and left, into a position adjacent each of the door operating units 54. The parts of the units 54 may be identical with those 41 to 51, already described, except that the slots of the operating plate 46 and arm 40 are inclined in a direction opposite of those of the parts described, for one of the units. In other words, the units must be of right and left forms, according to the direction in which the doors are to swing.

For a double door, such as is used on many delivery trucks, and as may be used on passenger vehicles, the latching device is modified, but may be operated in each unit by a shaft corresponding to the one 33, first described. Thus, on the one door 61, the shaft 33', as illustrated at the left in Figure 8, instead of operating a lateral latch bar, has a link 55 connected thereto and to an upwardly extending arm of a bell crank lever 56 pivoted on the door, the other arm of which bell crank extends toward the swinging edge of the door, and is pivotally connected to a vertically slidable bar 57, which is arranged to project below the edge of the door and engage in a suitable slot in the floor 12 at one position. The upper end of this bar is connected to a rocking lever 58 pivoted centrally of the lever on the door, its opposite end being connected to a vertical slidable bar 59, similar to the one 57, and extending upwardly so as to project above the top edge of the door and engage in the lintel 60 of the door, as shown in Figure 8, when the bar 57 is engaged in the floor 12. On the other door 62, the shaft 33'', is, in the present instance, shown as formed with two cranks 34'', from each of which the latch device 38' is extended beyond the swinging edge of this door, so as to engage inwardly of the corresponding or swinging edge of the opposite door, so that when the bars 57 and 59 are shot to secure the one door in closed position, and the latch elements 38' are shot to co-engage with the locked door, neither door can be opened. In the present instance, it is assumed that the doors open outward, as is customary in such exits where simple swinging doors are used.

While I have described with great particularity my invention in its best embodiment as thus far constructed, it will be understood that various changes in construction, arrangement and combination of parts, substitutions of materials and equivalents may be made without departing from the spirit of the invention, as more particularly set forth in the appended claims.

In the use of this invention, the device being assembled as described in connection with Figures 1 to 7, and the door being in closed position, in case of need for opening the door, the operator need only press the knob 21 to the left and rearwardly, and the door will be first unlocked and then opened. In the first part of the movement of the main lever after link 22 passes dead center, the rod 25 will be moved rearwardly so that the pin 42 moves rearwardly freely in the forward part of the slot 49, but swings the arm 40 so that the shaft 33 is rotated to operate the latch device and release the door, after which the pin 42 strikes the rear edge of the diagonal portion 50 of the slot in the plate 46, pressing this rearwardly and with it moving the door toward full open position.

The door may thus be operated, whether the spring hinge 32 is used, or not, but in case the spring hinge 32 is incorporated, it is only necessary to initiate the movement of the lever 17 sufficiently to overcome the dead center relation of the connection therewith, when the spring will complete the movement of the door to open position. On this account, the operator may very readily effect opening of the door by merely kicking the knob 21 with his foot, although complete movement of the lever 17 may also be effected by further pressure of the foot against the knob in the proper direction.

It is a special function and advantage of my invention that with the utilization of the spring hinge, in case of a collision in which persons or objects slide forward in the bus, the feet or bodies of persons striking the knob 21 or lever 17 will move the latter and link 22 from dead center relation, and cause the door to tend to move toward open position, and at least being free for opening after very slight movement of the operating lever. This same arrangement is also of great importance and value in case of a severe collision in which the driver or operator of the vehicle is pinned to the seat by the steering wheel, he may still release the lever 17 and effect movement thereof sufficiently to permit opening of the door, either automatically or by pressure from within.

It is also an important advantage of the invention that in a collision in which forward parts of the vehicle are collapsed and pressed toward the rear, movement of the rod 25 will thereby be effected, causing opening of the door.

It has before been pointed out how the construction of the operating means is such as to lock the door in both open and closed positions, respectively, when so operated, so that mischievous children or accidental movement of the door cannot affect the closing thereof, and impedance of exit of persons is reduced to a minimum liability.

I claim:
1. A closure and operating means consisting of a hinged door and having a closed position in a given plane, an operating member movable in a path toward and away from said plane within the radius of the door, means to move the operating member in said path, a plate fixed on the door having a slot to receive the operating member therein for sliding movement longitudinally of the slot, the first part of the slot extending from the initial closed position of the operating member in a direction coincident with said path, the slot having a lateral inclined part arranged so that one edge thereof will engage the operating member at completion of initial opening movement in the first arm of the slot, and the other edge will engage the operating member during initial closing movement of the operating member and so move the door in respective directions, latch means on the door, a latch operating member connected therewith pivoted on the door having an arm formed with a slot generally at an angle to the direction of said path and receiving said operating member therein for sliding movement relatively longitudinally of the slot, and being located so that the operating member will act against the sides of the slot while the operating member is moving in the said first part of the first named slot.

2. The structure of claim 1 in which said path is arranged close to a position tangent to the path of the medial part of the translative movement of the slotted members around the hinge axis of the respective door, whereby operative movement of the latch operating member will be minimized during movement of the door.

3. In a combined closure operator and fastener operator for hinged closures and the like wherein the closure has a closed position and an open position and wherein an operating reciprocating link is connected to the closure spaced from the hinge axis of the latter; a revoluble shaft on the closure, a movable fastener on the closure, operative connection between the shaft and the fastener, said shaft having its axis spaced from the path of the link, a longitudinally slotted lateral arm on said shaft projected from the closure diagonally across the said path, a wiper carried by the link in the slot of said arm whereby movement of the link in one direction will partly rotate the shaft in one direction and reverse movement of the link will reverse the motion of the shaft, an operating connection between the link and the closure comprising a cam plate on the closure parallel to said arm and to the path of the link and having a cam slot therein receiving a part of said wiper therein, said cam slot consisting of a short part alined with the path of the wiper when the closure is in closed position and having the wiper engaged therein when the parts are in initial closed position for free fastener-operating movement of the link and pin and said arm, said slot having a part diagonal to the plane of the closure and the path of the link and being also at an angle to the direction of the slot in said arm and extending generally toward the swinging edge of the closure and located so as to receive the wiper when it passes from the first named part of the slot, for wiping operation against the side of the diagonal part of the slot and operation of the closure.

ROBERT F. YOUNG.